United States Patent
Fukushima

[11] 3,770,344
[45] Nov. 6, 1973

[54] LIGHT SOURCE SYSTEM FOR OVERHEAD PROJECTORS

[75] Inventor: Yoshio Fukushima, Tokyo, Japan
[73] Assignee: Ricoh Co., Ltd., Tokyo, Japan
[22] Filed: May 19, 1970
[21] Appl. No.: 38,670

[30] Foreign Application Priority Data
May 20, 1969 Japan.............................. 44/39062
June 3, 1969 Japan.............................. 44/51662

[52] U.S. Cl........................ 353/38, 353/98, 353/81, 353/82
[51] Int. Cl. ............................................. G03b 21/32
[58] Field of Search...... 353/25–27, 82, 89, 94, 98, 353/99, 30–37, 48, 122, 38; 240/41 R, 41.35 A, .35 B, .35 E, 106.1, 41.3

[56] References Cited
UNITED STATES PATENTS
| | | | |
|---|---|---|---|
| 3,547,530 | 12/1970 | Poole | 353/98 |
| 1,635,863 | 7/1927 | Schulz | 240/41.3 |
| 3,041,600 | 6/1962 | Gumpertz | 353/25 |
| 3,247,367 | 4/1966 | Rayces | 240/41.3 |

OTHER PUBLICATIONS
Display Equipment Lighting – J. V. Collins; IBM Technical Disclosure, Vol. 3 No. 1, June 1960.

*Primary Examiner*—Louis R. Prince
*Assistant Examiner*—A. J. Mirabito
*Attorney*—Henry T. Burke, Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

An illumination system for overhead projectors which maintains a high luminance of the image projected while keeping a low temperature in the lamp house enclosing the system, comprising a number of small light sources arranged in individual compartments with reflectors and each having an associated Fresnel lens, all of which lenses are arranged in a co-planar relation so as to concentrate the total light flux upon the projection lens. Alternatively, the small light sources may be replaced by reflecting mirrors and a single lamp used as the light source whose flux is collected and reflected by the mirrors, thus permitting a protective reflector to be used between the lamp and the lens system to minimize the size of the lamp housing.

10 Claims, 5 Drawing Figures

PATENTED NOV 6 1973 3,770,344

INVENTOR
YOSHIO FUKUSHIMA

BY Henry J. Burke

ATTORNEY

LIGHT SOURCE SYSTEM FOR OVERHEAD PROJECTORS

BACKGROUND OF THE INVENTION

The present invention relates to an overhead projector and more particularly an improved light source system for overhead projectors.

In the conventional overhead projector, a projection lens with a smaller f-number must be used or the luminance of the light source must be increased in order to increase the luminance of the image projected. In the former case, the projection lens tends to become more complex in construction and expensive in cost. Furthermore, the depth of focus is decreased when the diameter of the projection lens is increased in order to obtain a smaller f-number, so that an out-of-focus projected image will result due to even a slight inclination of the stage surface, the optical axis of the projection lens or the screen. This means that the manufacture and assembly of the structural parts of an overhead projector must be made with a higher degree of precision. The operation becomes also complex. On the other hand, when the luminance of the light source in increased, much heat is generated, so that a device for cooling a light source system or lamp house must be provided and a Fresnel lens and an object to be projected are easily susceptible to deformation or damage. Overheating of the light source to-could be injurious to an operator. Since the spacing between the Frensel lens and the light source is greater, the light source system or lamp house becomes large in size and heavy in weight, thus resulting in inconvenience during transportation of the overhead projector.

SUMMARY OF THE INVENTION

It is therefore the primary object of the present invention to provide an improved light source system for overhead projectors which can completely eliminate such defects as described above.

It is another object of the present invention to provide an improved light source system for overhead projectors compact in size, light in weight and capable of keeping a high luminance of the image projected, and keeping a low temperature of the light source system or lamp house so that cooling may be accomplished in a simple manner.

According to one aspect of the present invention, a plurality of light sources are employed in spaced apart relation with each other and the light fluxes radiated are concentrated upon a projection lens through a plurality of Frensel lenses disposed in a coplanar relation with each other.

The advantages of the present invention may be summarized as follows:

(A) Since each light source is small, a paraboloidal or ellipsoidal reflector may be used so that the concentration of the light flux may be much improved; (B) Since the light sources are spaced apart from each other, cooling may be accomplished in a more simple and effective manner; (C) The light sources may be selectively turned on and off so that only a desired portion of the object may be projected if required; and (D) Instead of a single, large Fresnel lens as used on the conventional system, a plurality of small Fresnel lenses are used so that heat deformation of these Fresnel lenses may be prevented.

According to another aspect of the present invention, one light source and a plurality of reflecting mirrors are employed in such a manner that the light flux radiated may be redirected to the projection lens through a plurality of Fresnel lenses, whose number is the same as that of the reflecting mirrors.

Because of the provision of a plurality of reflecting mirrors the distance between the light source and the Fresnel lenses may be reduced, so that the lamp house may be designed compact in size. Furthermore, a plurality of virtual images of the light source may be formed so that more light flux may be used, thereby increasing the luminance at the surface of a stage glass by two to four times as compared with the conventional system. The distortion of the Fresnel lenses due to heating may be also prevented.

The above and other objects, features and advantages of the present invention will become more apparent from the following description of preferred embodiments thereof taken in conjunction with the accompanying drawing.

DESCRIPTION OF THE PREFERRED EMBODIMENTS

Figure 1:
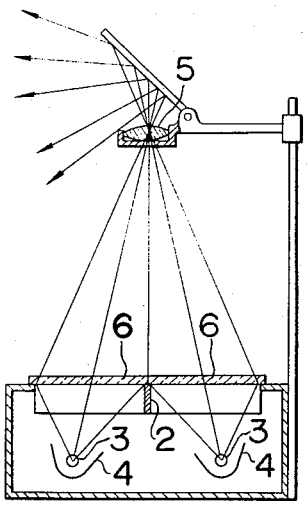
FIG. 1 is a side view partly in section of a first embodiment of the present invention.
Figure 4:
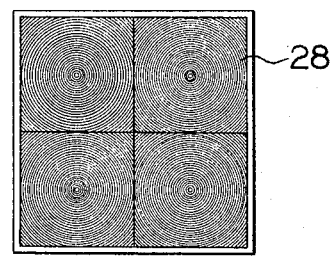
FIG. 4 is a top view of a Fresnel lens assembly used in the first and second embodiments of the present invention.

Referring to FIG. 1, a lamp house 1 is divided into for example four chambers (the two closest of which are shown) by crossed partition walls 2. Each chamber contains light source 3 having a paraboloidal or ellipsoidal reflector 4 disposed aside in some measure from the center portion of the chamber in such a manner that the light radiated may be redirected through a Fresnel lens 6 toward a projection lens 5. Four Fresnel lenses 6 each having the same focal length are disposed in a coplanar relation with each other and in opposed relation with the light sources 3 respectively. As will be appreciated from a consideration of FIGS. 1, 4 and 5 the optical axes of the four Fresnel lenses 6 are in parallel with each other and their optical centers lie on a line betwen the centers of their respective light sources 3 and the center of the projecting lens 5. The light radiated from the light sources 3 may be refracted through the Fresnel lenses 6 so as to be concentrated upon the projection lens 5 as if one Fresnel lens was used.

The numbers of the light sources 3 and the Fresnel lenses 6 may be increased or decreased in construction if required. A stage glass may be mounted upon the Fresnel lenses 6, although the latter may serve as a stage glass. Since the light sources 3 are spaced apart from each other, the cooling may become simple. Since each small Fresnel lens 6 intercepts the light radiated only from one small light source 3, the deformation due to the heating of the Fresnel lens 6 may be prevented.

Figure 5:
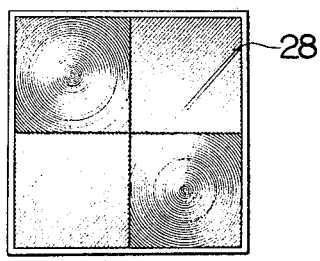
FIG. 5 is a top view of a Fresnel lens assembly wherein light sources are selectively turned on or off.

Further, the light sources 3 may be selectively turned on or off, for example, as shown in FIG. 5.

Figure 2:
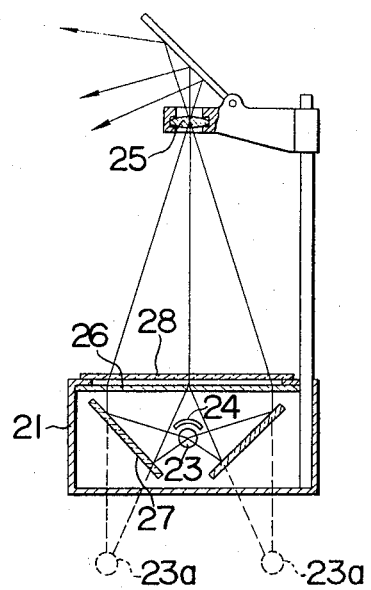
FIG. 2 is a side view partly in section of a second embodiment of the present invention.
Figure 3:
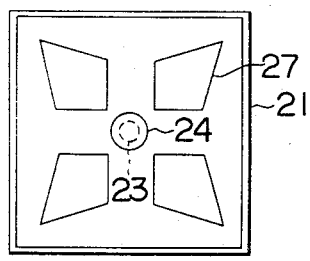
FIG. 3 is a top view thereof illustrating the arrangement of the reflecting mirrors relative to the light source.

FIG. 2 illustrates the second embodiment of the present invention in which only one light source 23 is disposed substantially at the center of the lamp house 21. A suitable reflector 24 is disposed above the light source 23 so that the light radiated therefrom will not reach directly to the four Fresnel lenses 26 disposed above the reflector 24 in a coplanar relation with each other. A stage glass 28 may be mounted upon the Fresnel lenses 26. In the lamp house 21 four reflecting mirrors 27 are disposed in such a manner as to replace the light sources 3 in FIG. 1. Thus, the optical center of each mirror 27 is offset from the optical axis of the respective Fresnel lens 26 and lies on a line with the optical center of the respective Fresnel lens and the optical center of the projection lens as so that the light flux from the light source 23 may be redirected toward the projection lens 25 through the four Fresnel lenses 26.

The light from the light source 23 is made incident upon the reflecting mirrors 27, so that four virtual images 23a of the light source 23 may be formed. The light flux from the light sources 23 may be concentrated upon the projection lens 25 through the Fresnel lenses 26, whereby the images of the virtual images 23a may be combined upon the projection lens 25.

Four Fresnel lenses 26 may be formed into a unitary construction while the cold mirrors may be used as reflecting mirrors 27. As compared with the conventional system wherein the light flux only in one direction is used, the present invention can increase the luminance at the surface of the stage glass by two to four times. Because of the provision of the reflector 24 above the light source 23, the light irradiated from the light source 23 will not directly reach the Fresnel lenses 26 so that the temperature rise at both of the surfaces of the Fresnel lenses 26 and the stage glass 28 may be prevented. Since the reflecting mirrors 27 are used, the distance between the light source 23 and the Fresnel lenses 26 may be reduced, so that the lamp house 21 may be designed compact in size especially shorter in height.

What is claimed is:

1. In an overhead projector of the type comprising:
  a. an illuminating means for receiving and shining light through an article containing an image to be projected; and
  b. a projection lens disposed to receive light from said illuminating means for projection onto an image viewing means;
the improvement wherein said illuminating means comprises:
  c. a lamp house divided into a plurality of chambers;
  d. a plurality of light sources each disposed in a respective one of said chambers; and
  e. a plurality of Fresnel lenses disposed in a coplanar relation with each other at the top of said lamp house, and each opposite a respective one of said chambers with its optical axis offset from the center of the respective light source therein and with its optical center lying on a line between the respective light source center and the optical center of the projection lens such that the light flux from said light sources is concentrated upon said projection lens through said Fresnel lenses.

2. A system as in claim 1 wherein each of said light sources is disposed within a paraboloidal or ellipsoidal reflector.

3. A system as in claim 1 wherein said plurality of Fresnel lenses are of unitary construction.

4. In an overhead projector of the type comprising:
  a. an illuminating means for receiving and shining light through an article containing an image to be projected; and
  b. a projection lens disposed to receive light from said illuminating means for projection onto an image viewing means;
the improvement wherein said illuminating means comprises:
  c. a lamp house;
  d. a light source disposed substantailly at the center of said lamp house;
  e. a plurality of Fresnel lenses disposed in a coplanar relation with each other and at the top of said lamp house;
  f. a plurality of reflecting members disposed at angles to the vertical axis of and around said light source with each of their optical centers offset from the optical axis of the respective Fresnel lens and lying on a line with the optical center of the respective Fresnel lens and the optical center of said projection lens so that the light flux radiated therefrom is redirected by said reflecting mirrors toward and concentrated upon said projection lens through said plurality of Fresnel lenses; and
  g. a reflector disposed above said light source for preventing the light from said light source from directly reaching said Fresnel lenses.

5. A system as in claim 4 wherein said plurality of Fresnel lenses are of unitary construction.

6. A system as in claim 2 wherein said reflecting mirrors are cold mirrors.

7. A light source system for overhead projectors of the type including;
  a. illuminating means contained in a housing;
  b. lens means for directing the illumination from said housing through a subject; and
  c. a projection lens for directing the illumination passing through said subject for imaging on a viewing screen;
wherein the improvement comprises:
  d. said illuminating means comprising a plurality of light-projecting means spaced from each other within said housing; and
  e. said lens means comprising a plurality of Fresnel lenses, each associated with one of said light projecting means with its optical axis offset from the center of the respective light-projecting means and with its optical center lying on a line between the center of the respective light-projecting means and the optical center of the projection lens for directing the light therefrom through said subject and concentrating it upon said projection lens.

8. A system as in claim 7 wherein a stage glass plate is placed upon said Fresnel lenses for receiving said subject.

9. A system as in claim 7, wherein each of said spaced light-projecting means comprises a lamp located in an individual chamber in said housing.

10. A system as in claim 7, wherein each of said spaced light-projecting means comprises a mirror for reflecting a part of the light flux from a single lamp.

* * * * *